United States Patent
Ozawa et al.

(10) Patent No.: US 6,321,385 B1
(45) Date of Patent: *Nov. 20, 2001

(54) DATA RECEIVING-PROCESSING APPARATUS AND METHOD, AND BROADCASTING METHOD

(75) Inventors: Toshiro Ozawa; Hirofumi Yuchi, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,241

(22) Filed: Oct. 12, 1999

Related U.S. Application Data

(62) Division of application No. 08/585,900, filed on Jan. 16, 1996, now Pat. No. 5,478,012.

(30) Foreign Application Priority Data

Jan. 19, 1995 (JP) .................................................... 7-006092

(51) Int. Cl.[7] .................................................... H04N 7/10
(52) U.S. Cl. ..................... 725/140; 725/152; 380/227; 380/241; 380/242
(58) Field of Search ................................... 348/460, 461, 348/465, 468; 725/131, 32, 132, 139, 140–141, 151, 152–153; 380/227, 242, 10, 20, 241; H04N 7/10

(56) References Cited

U.S. PATENT DOCUMENTS

| | | | |
|---|---|---|---|
| 5,237,610 | * | 8/1993 | Gammie et al. .................. 380/10 |
| 5,541,662 | * | 7/1996 | Adams et al. .................. 348/460 |
| 5,978,012 | * | 11/1999 | Ozawa et al. .................. 725/131 |

* cited by examiner

*Primary Examiner*—Michael Lee
(74) *Attorney, Agent, or Firm*—Jay H. Maioli

(57) ABSTRACT

A data receiving-processing apparatus including a receiver for receiving an extended function program or data transmitted thereto, a processor for processing the received data, a first storage such as a read-only memory for storing a basic program used to execute the data processing and an ID code to identify the apparatus and having a branch for the extended function program, a second storage such as a nonvolatile memory for storing the extended function program in a compressed state, a third storage such as a volatile memory for storing the extended function program in an decompressed state, and a decision maker for making a decision as to whether the ID code has predetermined content. The received data is processed in accordance with the basic program stored in the first storage and, after the extended function program stored in the second storage is read out at the branch in the basic program, the data is processed in accordance with the extended function program. In this apparatus, a new extended function program can be added at low cost as required.

2 Claims, 3 Drawing Sheets

DATA RECEIVING-PROCESSING APPARATUS AND METHOD, AND BROADCASTING METHOD

This is a division of prior application Ser. No. 08/585,900 filed Jan. 16, 1996, now U.S. Pat. No. 5,978,012.

BACKGROUND OF THE INVENTION

1. Field of the Invention

The present invention relates generally to a data receiving-processing apparatus, a data receiving-processing method and a broadcasting method, and more particularly to those adapted for use in transmitting and receiving digitized video data via a broadcast satellite or a communication satellite for example.

2. Description of the Related Art

There is recently noticed the remarkable diffusion of a broadcasting system which digitizes audio and video signals and broadcasts such signals via a satellite. Digitizing the desired signals permits transmission of data as well as video and audio signals.

According to this system, a broadcast signal can be received by the use of an exclusive data receiving-processing apparatus (decoder). This is rendered possible, by allocating a unique number (decoder ID) to each decoder and identifying such decoder ID, and providing a predetermined service (e.g., enabling reception of a particular pay program) only to a user having a specific decoder. In other words, it becomes possible to realize a conditional access function.

In this field, continuous growth is currently in progress for what services are providable, and a high possibility exists that new services in some novel form will start hereinafter. For this reason, it is preferred that each decoder be designed to be capable of receiving any new service upon start thereof. In a situation where a new service is receivable only by a user who has purchased a new decoder, there arises a difference among services capable of being received depending on the time of purchase of the decoder.

In the case of adding a new service (new function) as mentioned above, some additional modification needs to be given to the program in the decoder. In an attempt to achieve such modification, it has been discussed heretofore to adopt a method of collecting the decoder from each user and, after replacing the program ROM incorporated therein, returning the decoder to the user again or replacing the whole decoder with a new one, or to adopt a method of distributing a new IC card to each user and loading a new program from the IC card into the decoder by utilizing an IC card interface incorporated in the decoder.

However, in the situation where the number of decoders already sold amounts to a great number, as a practical matter, it would be difficult to collect all of the decoders. And in the method of distributing IC cards, there exists a problem that, in addition to the required cost, any modifiable program is limited to a short program since the memory capacity of the IC card is generally extremely small.

SUMMARY OF THE INVENTION

It is therefore an object of the present invention to realize simple additional modification of even a relatively long program at low cost.

According to a first aspect of the present invention, there is provided a data receiving-processing apparatus which comprises a receiving means for receiving an extended function program or data transmitted thereto, a processing means for processing the data received by the receiving means, a first storage means for storing a basic program used to execute the data processing by the processing means and having a branch for the extended function program, and a second storage means for storing the extended function program received by the receiving means. The processing means processes the received data in accordance with the basic program stored in the first storage means and, when the extended function program is stored in the second storage means, reads out the extended function program from the second storage means at the branch in the basic program and then processes the data in accordance with the extended function program thus read out.

According to a second aspect of the present invention, there is provided a broadcasting method which comprises the steps of previously storing, in a receiver, a basic program used to decode video data and having a branch for an extended function program; receiving the broadcasted video data by the receiver and decoding the received video data in accordance with the basic program stored previously; broadcasting an extended function program from a transmitter at the time of enabling the receiver to execute a predetermined decoding process, thereby operating the receiver to receive and store the extended function program; and upon storage of the extended function program in the receiver, reading out the extended function program at the branch, and decoding the video data in accordance with the extended function program.

According to a third aspect of the present invention, there is provided a digital television receiver which comprises a receiving means for receiving at least a video signal, an audio signal and an extended function program transmitted thereto; a processing means for processing the video and audio signals received by the receiving means; a first storage means for storing a basic program used to control the processing of the video and audio signals executed by the processing means, the basic program having a branch for an extended function program; and a second storage means for storing the extended function program received by the receiving means; wherein the processing means processes the audio and video signals, which have been received by the receiving means, in accordance with the basic program stored in the first storage means, and when the extended function program is stored in the second storage means, the processing means reads out the extended function program from the second storage means at the branch in the basic program, and then processes the video and audio signals in accordance with the extended function program thus read out.

In the present invention, whenever any extended function program is required, the program is transmitted and stored on the receiving side. A branch for the extended function program is prepared in the basic program, so that when the extended function program has been stored, the extended function program can be read out at the branch in the basic program, whereby the data can be processed in accordance with the extended function program thus read out. Consequently, it becomes possible to transmit and add a new extended function program at any time in compliance with requirements.

The above and other features and advantages of the present invention will become apparent from the following description which will be given with reference to the illustrative accompanying drawings.

DESCRIPTION OF THE PREFERRED EMBODIMENTS

Figure 1:
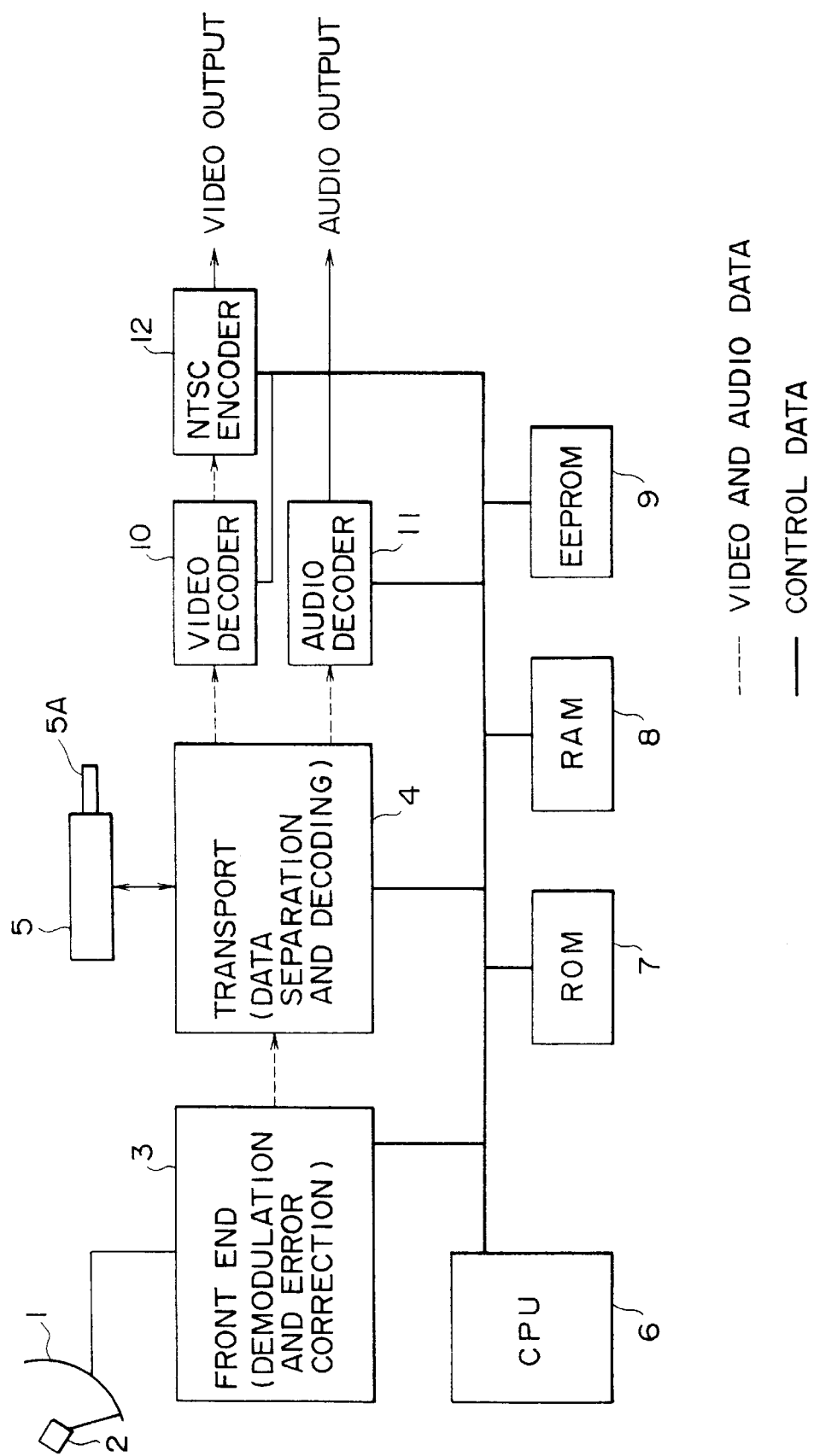
FIG. 1 is a block diagram showing an exemplary arrangement of a digital telecast decoder where the data receiving-processing apparatus of the present invention is applied.

FIG. 1 shows an exemplary arrangement of a digital telecast decoder constructed by applying the data receiving-processing apparatus of the present invention. An antenna 1 receives broadcast waves from an unshown satellite and outputs the same as an electric signal to a converter 2. Then the converter 2 down-converts the signal received at the antenna 1 into a signal of a predetermined frequency and outputs the converted signal to a front end 3.

The front end 3 demodulates the signal obtained from the converter 2 and, after error correction, outputs the corrected signal to a transport block 4. Subsequently, the transport block 4 separates the input data of unitary packets from the front end 3 into a video data packet, an audio data packet and other data packets (e.g., a packet of conditional access data which includes an extended function program mentioned later).

The conditional access data is sent via an IC card interface 5 to an IC card 5A, where a decision is made as to whether the relevant decoder has an access right to the input signal. If the result of this decision signifies that the decoder has an access right, a decipher key (control word) is outputted to the transport block 4, which then executes a deciphering process by use of this control word.

The data of a video packet separated in the transport block 4 is supplied to a video decoder 10, while the data of an audio packet is supplied to an audio decoder 11. The video decoder 10 decodes the input video data and outputs the decoded data to an NTSC (National Television Systems Committee Standard) encoder 12. Then the NTSC encoder 12 encodes the input video data into a video signal of the NTSC system standard and outputs the same therefrom.

Meanwhile the audio decoder 11 decodes the input audio data and then outputs the decoded data as an audio signal.

A CPU 6 executes a variety of processes in accordance with a program stored previously in a ROM 7, and stores in a RAM 8 any data and so forth required for each process. An EEPROM 9, which is a nonvolatile reprogrammable memory, is used to store any data (e.g., a pass word or a channel number received immediately before switch-off of the power supply) necessary to be retained even after the power supply for the decoder is switched off.

When the EEPROM 9 is used to store any data necessary to be retained even after switch-off of the power supply, its required capacity may be at most several hundred bytes or so. In this embodiment, however, an extended function program is written in the EEPROM 9. Therefore, the required capacity of the EEPROM 9 employed in this embodiment for example amounts to 32 kilobytes.

Now the operation of the above embodiment will be described below. When the power supply for the decoder is switched on, the CPU 6 controls each block in accordance with the program stored in the ROM 7 and starts a receiving operation, so that the signal received at the antenna 1 is supplied via the converter 2 to the front end 3 to be thereby demodulated. And after error correction, the demodulated signal is supplied to the transport block 4. Then the transport block 4 separates the input packet data from the packet ID and supplies the video data to the video decoder 10 while supplying the audio data to the audio decoder 11.

The video decoder 10 decodes the input video data and outputs the decoded data to the NTSC encoder 12. Subsequently the NTSC encoder 12 converts the input video data into a video signal of the NTSC system standard and outputs the converted signal. Meanwhile the audio decoder 11 decodes the input audio data and outputs the decoded data as an audio signal.

In this manner, both pictures and sounds corresponding respectively to the video data and the audio data broadcasted via the satellite can be watched and listened to on an unshown monitor unit.

When the conditional access data has been inputted, the transport block 4 supplies the same to the IC card 5A via the IC card interface 5. A CPU incorporated in the IC card 5A requests the CPU 6, via the transport block 4, to read out the decoder ID allocated to the relevant decoder. In response to such a request, the CPU 6 reads out the decoder ID stored in the ROM 7 (or EEPROM 9) and then supplies the decoder ID via the transport block 4 to the IC card 5A.

The CPU incorporated in the IC card 5A makes a decision as to whether the decoder ID has an access right to the conditional access data or not. And if the result of this decision signifies that the decoder ID has an access right, a control word is supplied to the transport block 4. Subsequently in the transport block 4, there is executed a process of deciphering or descrambling the conditional access data by the use of such a control word.

An extended function program is also included in the conditional access data.

Therefore the extended function program ciphered similarly is transmitted, via the satellite, as a plurality of packets inclusive of predetermined decoder ID. Consequently, only a decoder including the specific decoder ID has an access right to these packets and is enabled to decipher the same, whereby it is rendered possible merely for a user, who paid a predetermined additional fee already, to add the required extended function.

The CPU 6 transfers the extended function program, which has been deciphered in the transport block 4, to the EEPROM 9 and then stores the program therein.

Figure 2:
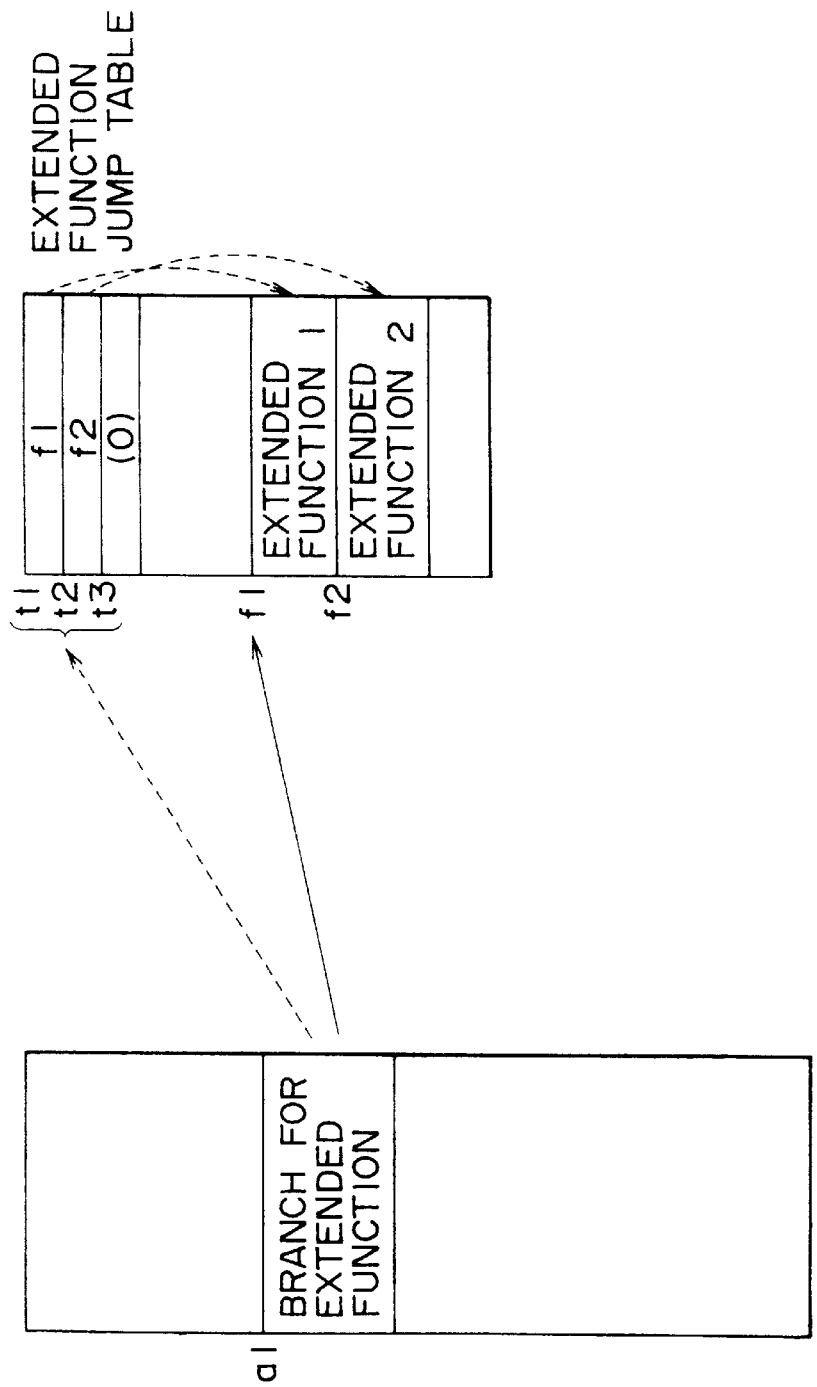
FIG. 2 is a schematic diagram for explaining programs stored in a ROM 7 and an EEPROM 9 included in FIG. 1.

FIG. 2 shows a basic program stored in the ROM 7 and extended function programs stored in the EEPROM 9.

More specifically, the basic program stored in the ROM 7 includes, in its address a1 for example, a branch step for the extended function program. This branch step is so programmed that an address stored at each of, e.g., entries t1 to t3 of the EEPROM 9 is read and, when the address is 0, it is regarded as no storage of any extended function program therein, and an error process is executed. Meanwhile, when a predetermined address is written therein, the corresponding address of the EEPROM 9 is accessed so that the extended function program stored in that address is read out therefrom.

In the embodiment of FIG. 2, an address f1 is described at an entry t1 of the EEPROM 9, and an address f2 is described at an entry t2. An extended function program 1 is written in the address f1 of the EEPROM 9, while an extended function program 2 is written in the address f2. Therefore, either the extended function program 1 or 2 is executed.

In this embodiment, 0 is written at an entry t3 of the EEPROM 9. Consequently, this embodiment is in such a state that merely two of the three extended function programs can be utilized, but the third one is not utilizable yet.

In comparison with the RAM 8, the EEPROM 9 is generally slower in access speed, smaller in capacity and more expensive. Therefore the production cost of the EEPROM 9 is greatly increased if its capacity is required to be large. In order to eliminate such a disadvantage, there may be contrived a technique of compressing and storing an extended function program in the EEPROM 9 and, at the time of switching on the power supply or starting the program, unwinding (e.g., decompressing or expending) the compressed extended function program stored in the EEPROM 9 and then writing the unwound or decompressed program in the RAM 8.

Figure 3:
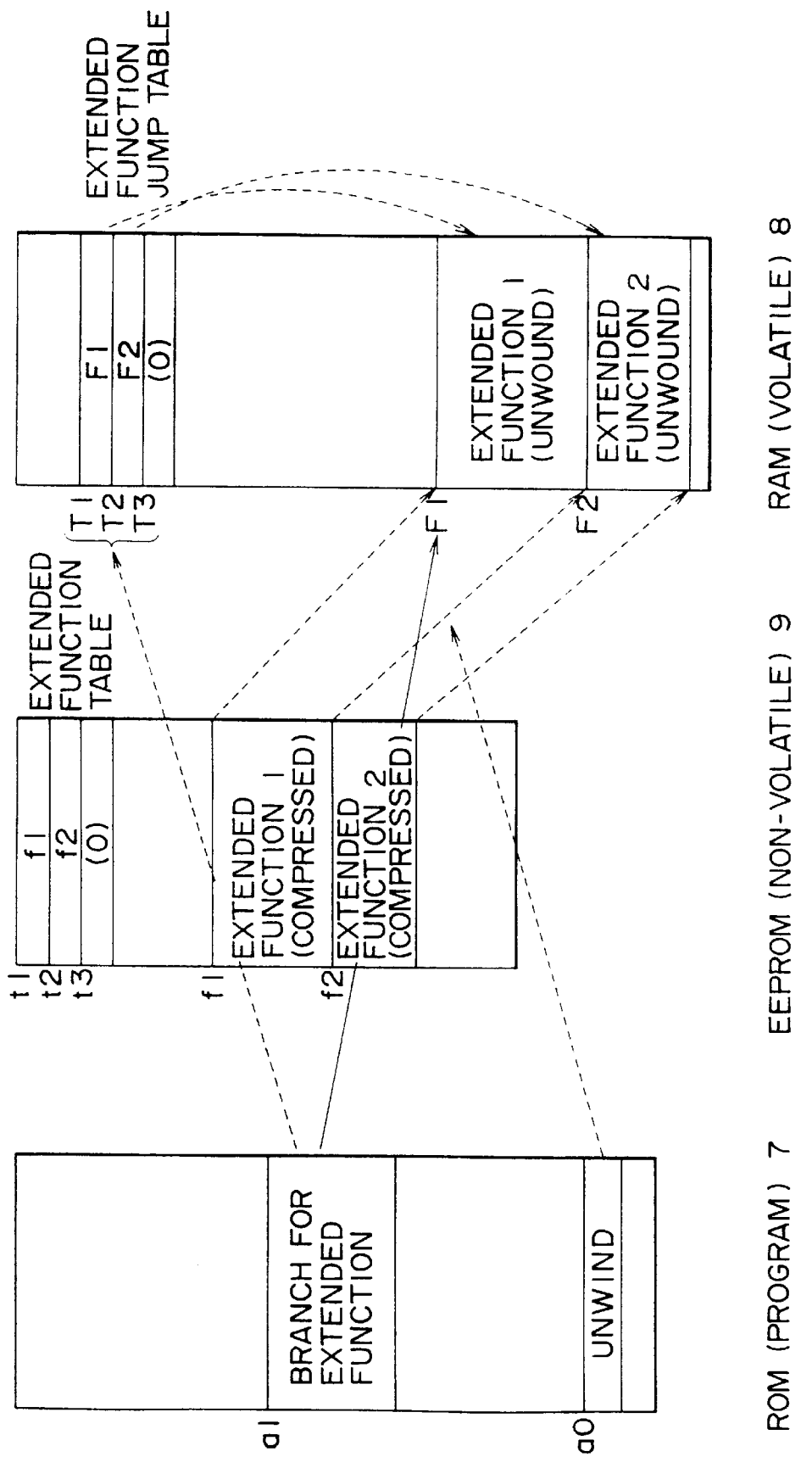
FIG. 3 is a schematic diagram for explaining programs stored in a ROM 7, a RAM 8 and an EEPROM 9 included in FIG. 1.

FIG. 3 shows an embodiment representing the above case. Similar to the aforementioned example, an extended function program transmitted via a satellite is written in the EEPROM 9. However, in the embodiment of FIG. 3, the extended function program is sent in a compressed state from the transmitter side and then is stored in the EEPROM 9 while being retained in such a compressed state. Consequently, it becomes possible to hold even a relatively long program in the EEPROM 9 without the necessity of increasing its storage capacity very much. In addition the extended function program may be sent from the transmitter side as uncompressed data and may be stored in the EEPROM 9 after being compressed by the CPU 6 on the receiver side.

For compression of a program, there is adopted a lossless data compression method based on reversible encoding which is capable of completely resuming the former original data by unwinding (e.g., decompressing or expending) the compressed data. Some known codes adequate for such data compression are, e.g., run length code, Huffman code, arithmetic code, and Lempel-Ziv code.

In this embodiment, there is a description in an address a0 of the ROM 7 to execute a process of unwinding the compressed extended function program stored in the EEPROM 9 when the power supply for the encoder is switched on, whereby an extended function table stored in the EEPROM 9 is unwound or decompressed and stored in the RAM 8. In the embodiment of FIG. 3, addresses F1, F2, 0 are described as corresponding to the descriptions f1, f2, 0 at entries t1 to t3 of the EEPROM 9. An extended function program 1 in an unwound or decompressed state is stored in the address F1 of the RAM 8, and an extended function program 2 in an unwound or decompressed state is stored in the address F2.

Entries T1 to T3 of the RAM 8 are described at the branch step for the extended function program in the address a1 of the ROM 7. Therefore, similar to the foregoing example of FIG. 2, it is possible to execute the extended function program 1 stored in the address F1 of the RAM 8 written at the entry T1, and also the extended function program 2 stored in the address F2 written at the entry T2.

Differing from the state in the EEPROM 9, the unwound or decompressed extended function programs stored in the RAM 8 are erased when the power supply for the decoder is switched off. Therefore the program unwinding or decompressing process is necessary every time the power supply is switched on. However, the programs once unwound or decompressed are continuously utilizable until switch-off of the power supply.

In a case where the storage area of the RAM 8 may become insufficient, the extended function programs can be erased, whenever not required, in response to a command from a user. It is also possible to modify the configuration in such a manner that the CPU 6 detects probable insufficiency of the storage area of the RAM 8 and erases any unrequired program.

Thus, the present invention enables only a specified decoder to utilize, e.g., game software or an electronic program guide (EPG) for selecting a desired one of many broadcast channels, or to monitor pay-per-view pictures.

In a case where merely video data alone out of video and audio data is normally scrambled (ciphered) and broadcast, if the broadcasting method is so changed as to scramble the audio data as well, a program necessary for descrambling the scrambled audio data can be transmitted from a broadcasting station (transmitter side) to each encoder (receiver side) so that the scrambled audio data can also be descrambled.

In the embodiment mentioned above, an EEPROM is employed as a memory for holding the data even in an off-state of the power supply. However, any other memory is usable as well if it is nonvolatile and reprogrammable, and the timing necessary for unwinding (e.g., decompressing or expending) the compressed program may be set to coincide with the use thereof.

According to the present invention, as mentioned above, an extended function program is transmitted and stored whenever necessary. A branch for the extended function program is previously prepared in a basic program and, when the extended function program has been stored, it can be read out at the branch in the basic program, so that data can be processed in accordance with the extended function program thus read out. Therefore, it becomes possible to transmit and add a new extended function program in compliance with requirements.

Although the present invention has been described hereinabove with reference to some preferred embodiments thereof, it is to be understood that the invention is not limited to such embodiments alone, and a variety of other modifications and variations will be apparent to those skilled in the art without departing from the spirit of the invention.

The scope of the invention, therefore, is to be determined solely by the appended claims.

What is claimed is:

1. A data receiving-processing method for receiving data transmitted to a data receiving-processing apparatus and for processing the data, said method comprising the steps of:

receiving data and receiving an extended function program relating to added functions of the apparatus transmitted thereto, said extended function program being transmitted in scrambled and compressed states;

processing the received data;

storing an ID code to identify the data receiving-processing apparatus;

storing a basic program used to execute the data processing, said basic program having a branch for said extended function program;

deciding whether said ID code stored has a predetermined content;

descrambling said transmitted extended function program; and decompressing said descrambled extended function program, wherein said step of processing the received data processes the received data in accordance with said basic program stored such that only when a result of the decision made signifies that the ID code stored has the predetermined content, said scrambled extended function program is descrambled and then is stored, the descrambled extended function program is read out and decompressed, the decompressed extended function program is read out at the branch in the basic program, and the data is processed in accordance with the read-out extended function program.

2. A data receiving-processing apparatus for use by a subscriber and for receiving data transmitted thereto and processing the data, said apparatus comprising:

receiving means for receiving data and for receiving an extended function program relating to added functions of the apparatus transmitted thereto, said extended function program being transmitted in scrambled and compressed states;

processing means for processing the data received by said receiving means;

storage means for storing an ID code to identify the data receiving-processing apparatus and for storing a basic program used to execute the data processing by said processing means, said basic program having a branch for said extended function program;

decision means for making a decision as to whether said ID code stored in said storage means has a predetermined content;

descrambling means for descrambling said transmitted extended function program; and decompression means for decompressing the descrambled extended function program, wherein said processing means processes the data received by said receiving means in accordance with said basic program stored in said second storage means such that only when a result of the decision made by said decision means signifies that the ID code stored in said storage means has the predetermined content, said scrambled extended function program is descrambled and decompressed and read out at said branch in said basic program, and said processing means processes the data in accordance with the read-out extended function program.

* * * * *